June 27, 1939.　　E. C. RANEY ET AL　　2,164,221
CONTROL APPARATUS
Filed Sept. 10, 1936　　3 Sheets-Sheet 1

INVENTOR
Estel C. Raney and
BY Arthur M. Hoover,
Warren H. F. Schmieding
ATTORNEY

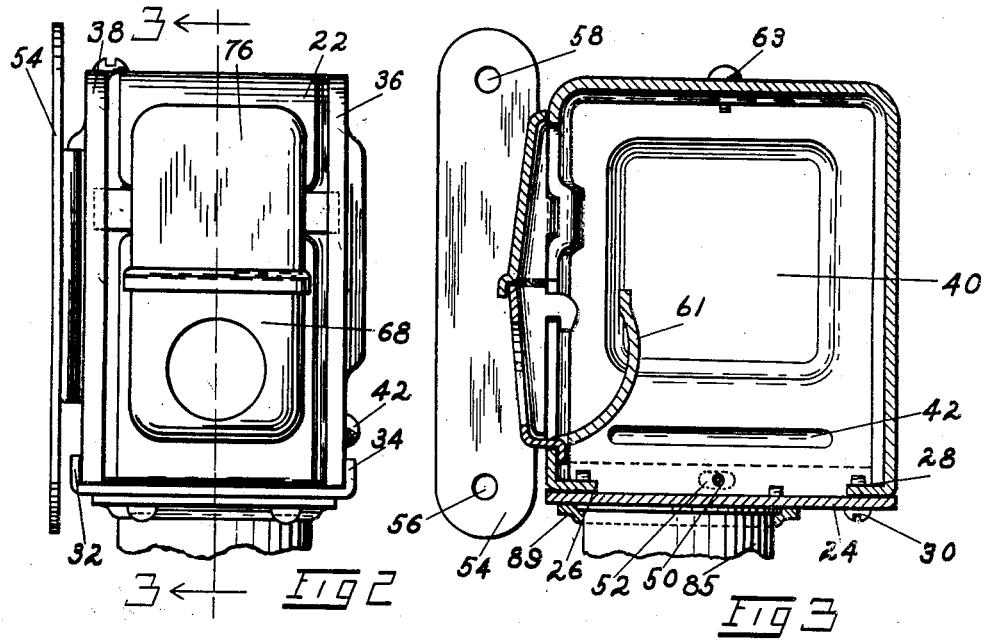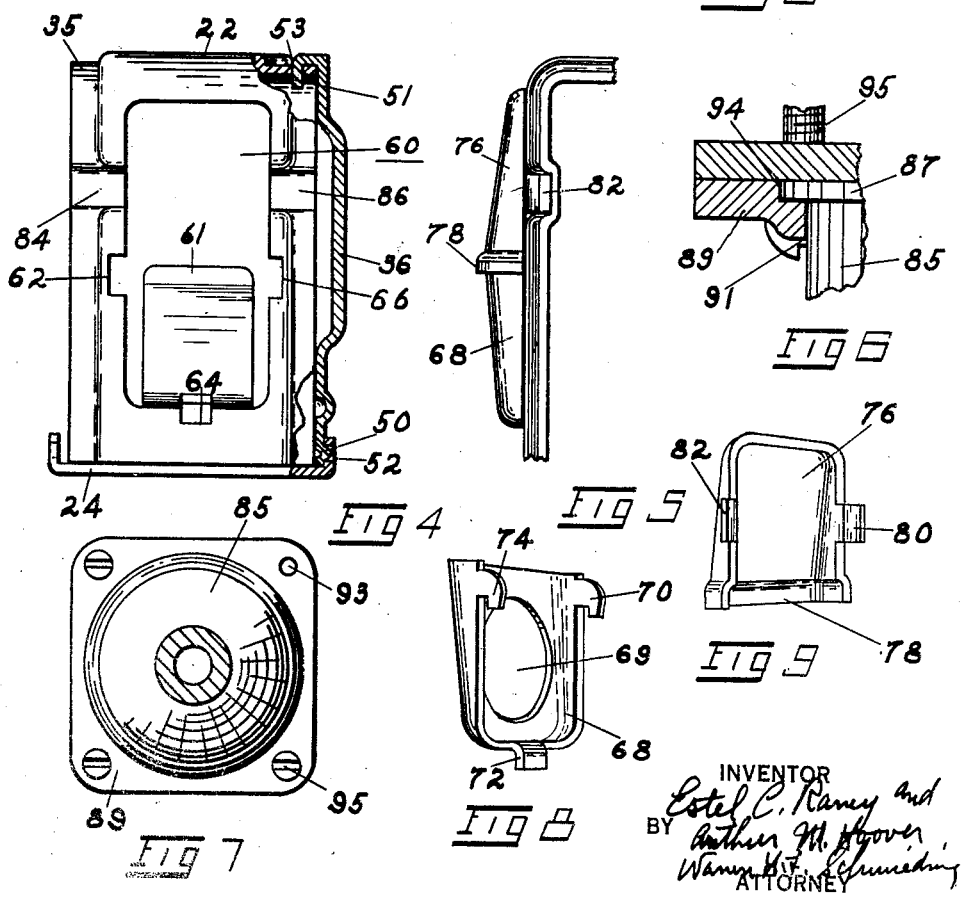

June 27, 1939.  E. C. RANEY ET AL  2,164,221
CONTROL APPARATUS
Filed Sept. 10, 1936  3 Sheets-Sheet 3

INVENTOR
Estel C. Raney and
BY Arthur M. Hoover
Warren F. Schmidt
ATTORNEY

Patented June 27, 1939

2,164,221

UNITED STATES PATENT OFFICE 2,164,221

CONTROL APPARATUS

Estel C. Raney and Arthur M. Hoover, Columbus, Ohio, assignors to Ranco Incorporated, Columbus, Ohio, a corporation of Ohio Application September 10, 1936, Serial No. 100,146

5 Claims. (Cl. 174—52)

Our present invention relates to electrical control apparatus and more particularly to housings for electrical apparatus that include attachments for electrical conduits and the like.

One of the objects of our invention is to provide a housing or box for an electrical switch that includes a removable wall portion to facilitate the connection of such as armored cable and the like.

Another object is to provide a casing for a switch in which the removable wall portion is locked in place by the replacement of a second removable wall portion.

Another object is to provide a wall portion which includes a bracket for mounting the switch in a permanent position, said wall portion being removable so that the entire switch assembly may be easily detached and attached without disturbing the permanent mounting.

Another object is to provide a wall or shield behind the removable wall which carries the conduit connection, to protect the internal mechanism from the conduit wires.

Another object is to provide the casing with a terminal block that will be accessible through the opening made by removing one of the wall portions.

A further object is to provide the housing with a rotatable extension housing which surrounds a bellows, or a like type of flexible metallic wall, so that the bellows and its housing may be relatively rotatable with respect to the housing without disturbing the mounting of the switch, or the switch adjustment.

Other and further objects and advantages will be apparent from the following description, reference being had to the accompanying drawings wherein a preferred form of embodiment of the present invention is clearly shown.

In the drawings:

Fig. 2 is a side elevational view of the box with the bellows housing cut away.

Fig. 3 is a sectional view taken on line 3—3 of Fig. 2.

Fig. 4 is a partial side elevational view of the box with the removable conduit plates removed and one side cover removed; the box is cut away at top and bottom to show how the side plate locks in place.

Fig. 5 is a partial side view of the conduit connection plates, the side plates being removed.

Fig. 6 is a sectional view on a larger scale showing the mechanism to mount the bellows housing so that it is rotatable relative to the main housing.

Fig. 7 is a top view of the bellows housing and bearing plate with one of the connection screws removed;

Fig. 8 is a perspective view of one of the removable conduit connection plates;

Fig. 9 is a perspective view of the second removable plate.

Figure 1:
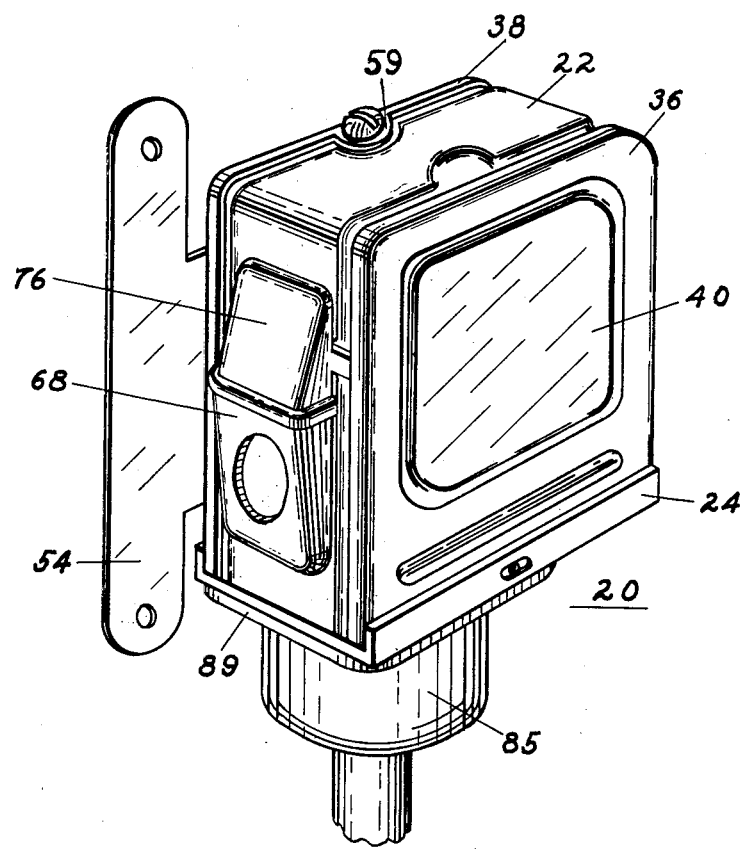
Fig. 1 is a perspective view of a preferred embodiment of an assembled conduit box.

Referring to the drawings, a base or support plate 24 is used as a supporting member for the conduit box assembly 20. The plate 24 is made of pressed metal and has two opposite edges 32 and 34 turned up at 90 degrees to the surface of the plate to form a shallow U-shaped trough. A main frame 22 for the switch casing, of substantially inverted U-shape, is secured to the base 24 by screws 30 which pass through the base and are threaded into ears 26 and 28 on the frame 22. The transverse dimension of the frame 22 is less than the corresponding dimension of the base 24. This may be noted on Fig. 4 where sufficient distance is left between the frame 22 and the upturned edges 32 and 34 of base 24 to allow the insertion therebetween of side plates 36 and 38. Each of plates 36 and 38 is turned at 90 degrees to the surface of the plate on three edges thereof to form a definite stop for the plates 36 and 38 against the frame 22 and to assure the tight closure of the box when the plates 36 and 38 are assembled to the box. The plates 36 and 38 are slidably engaged to the open sides of the frame 22, which frame is suitably depressed on its edges as at 35, so that when the side plates are in position, that the faces of the plates and the edges of the frame are substantially flush. The lower ends of both the plates 36 and 38 are provided with extending points 50 substantially in the center of the lower edge of the plates, which spring, due to the resiliency of the plates 36 and 38, into cooperating slots 52 in the upturned edges 32 and 34 of the base 24. In this manner the plates 36 and 38 are yieldingly held in position. Outwardly pressed portions as at 40 and 42 are also provided in the plates 36 and 38 to be employed as a grip so that the plates may be removed by sliding them upwards along the frame 22. The upper end of plate 36 has a downwardly disposed catch 51 that fits within a slot 53 in the frame 22. This slotted engagement eliminates the possibility of dislodging or disturbing the plate 36 unintentionally. In fact the only way by which plate 36 may be removed to expose the mechanism is by pulling the same upward until the catch arrangements are disengaged. The upper end of plate 38 has an ear 59 that has a hole therethrough. A screw 63 may be passed through the ear 59 and threaded into the frame 22 to provide a rigid connection.

The plate 38 is also provided with an outwardly extending off-set bracket 54, which is preferably spot-welded in place and thereby rigidly attached to the plate 38. The bracket 54 has two holes 56 and 58 at its opposite ends, so that the plate 38 may be screwed to a permanent support, for example, a wall or post. Thus the entire switch and casing may be removed from the support by merely removing the screw 63 and sliding the casing away from the plate 38. The casing may be re-engaged by reversing the described operations.

The left side of the frame 22 is provided with a substantially rectangular cut-out portion 60. The cut-out includes three small identations 62, 64 and 66 disposed at the lower part of the cut-out 60 on the three sides thereof. An arcuate section or wall 61, formed from the metal punched-out of the section 60, forms a guard behind the lower half of the cut-out 60 to prevent the connecting wires (see Fig. 12) from interfering with the mechanism enclosed by the box. A protruding cover or plate 68 is used to cover the lower portion of the cut-out 60 and is provided with a central hole 69 of any suitable diameter for attaching a BX cable or other conduit.

The cover 68 has three ears 70, 72 and 74 which are in the form of hooks to be inserted at the identations 62, 64 and 66 respectively. And when so inserted and the cover 68 is slid downwardly, these hooks engage the inside of frame 22. When the cover 68 is engaged with the frame 22, it forms an enclosed protruding box portion that is firmly held to the frame 22 and cannot be disengaged, except by upward movement. Thus the cover 68 may be readily removed in order to attach a cable to it.

A second removable cover 76 for the box, of the same general shape as cover 68 is used to lock the first cover 68 in place. The cover 76 has an outwardly extending flange 78 that fits over, or interlocks with the cover 68. This interlocking effect may be noted in Figs. 2 and 5. The cover 76 has also two extending ears 80 and 82 that fit in depressed groove portions 84 and 86 respectively and formed in the frame 22. In this manner the cover 76 may be placed on the frame 22 with the ears 80 and 82 in the depressions 84 and 86, so that the ears 80 and 82 will be substantially flush with the face of the frame 22. The side plates 36 and 38 may then be slipped into place to lock the cover 76 in place. Thus the removable interlocking covers 68 and 76 may be locked in place on the frame by the side plates 36 and 38. It is to be noted that the ear 80 can be inserted or removed from the depression 84 when frame 22 is attached to the plate 38 and therefore it is necessary only to slide the plate 36 upwardly to allow the cover 76 to be drawn away from the box so that the ear 80 can be withdrawn from beneath the side plate 38. When the cover 76 is removed, the cover 68 may be easily disengaged. A reversal of the above operations will again lock the covers into place.

Figure 10:
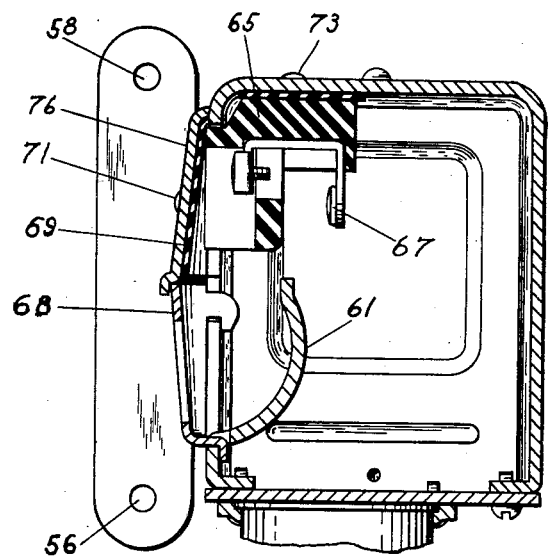
Fig. 10 is a sectional view taken on line 3—3 of Fig. 2 including a terminal block.

In one form of our invention a connection block 65 is mounted by rivets 73 or other suitable means directly within the box (see Fig. 10). The connection block 65 is placed directly behind the upper removable cover 76 to facilitate connections. In the embodiment shown, the block 65 carries contacts 67 for switch mechanism that may be placed within the box. The cover 76 is provided with an internal insulating shield 69 attached to the cover 76 by a rivet 71. This shield prevents accidental short circuits due to loose wires etc., at the connection block. The position of the block is clearly shown in Fig. 11.

Figures 11, 12:
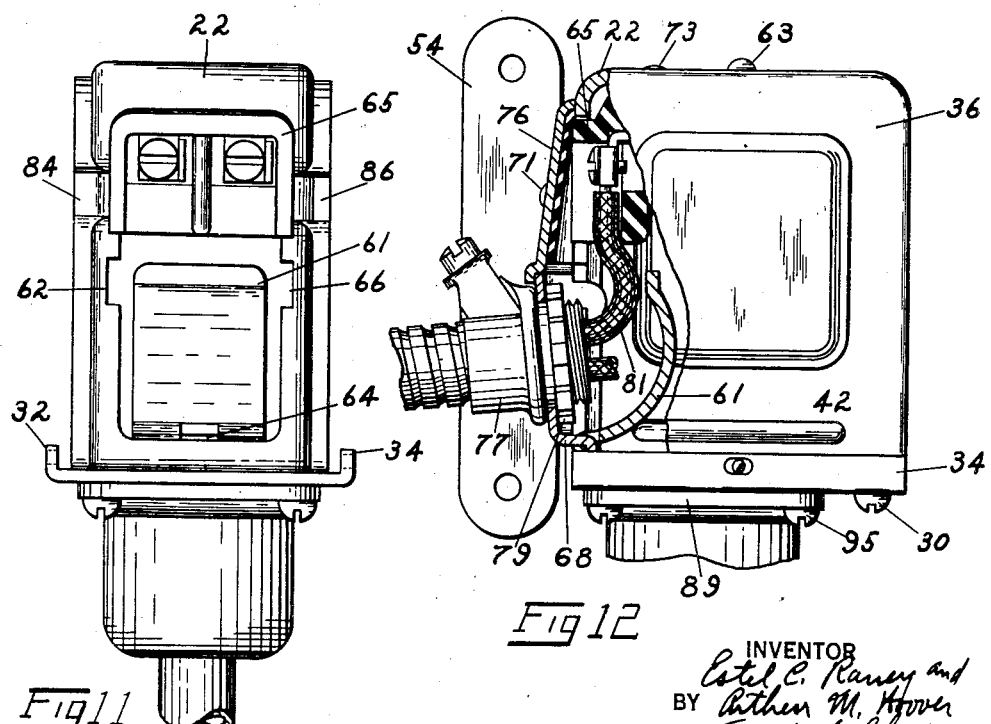
Fig. 11 is a side elevational view of the box with both side plates removed, showing the relative position of the terminal block and, Fig. 12 is a view of the box partly shown in section with an armored cable attached to the removable plate; it also shows the protection afforded by the inner shield and the means utilized to connect the wiring to the terminal block.

Fig. 12 shows the method of connecting the box to BX cable or the like. A cable coupling 77 is fixed to the cover 68 by a nut 79. A wire 81 is connected to the terminal block 65 to descriptively show how the arcuate section 61 shields the internal mechanism from the connecting wiring.

Another feature of our improved casing 20 is the rotatable connection of the bellows housing 85. In a switch operated by changes in pressure, a bellows, or like type of flexible metallic wall, is often used as an actuating means. It is desirable to be able to rotate the bellows to prevent excessive bending of the attached tubing. To accomplish this result we have provided the bellows housing 85 with an outwardly extending flange 87. A collar 89, which has a central hole 91 of a diameter less than the diameter of the flange 87 but sufficiently large to allow rotation of the housing 85 within the hole 91, is slipped over the housing. The collar 89 has holes 93 for receiving screws 95 to attach the collar 89 and depended housing 85 to the base 24 of the casing 20. When the screws 95 are loosened slightly, the housing 85 and its enclosed bellows may be rotated. When the desired location of the housing 85 is attained the screws 95 may be tightened and the assembly is rigid. If desired the collar 89 may be machined at 94, to provide an undercut portion, so that the flange 87 is a snug fit between the collar 89 and the base 24, in this case the screws 95 may be tightened and the housing will be rotatable but there will always be sufficient friction between the collar 89 and the flange 87 and the base 24 to prevent accidental rotatable movement of the housing 85.

From the foregoing it will be seen that we have provided an inexpensive casing for an electrical apparatus that includes a novel means for connecting a conduit to the box and together with a means for mounting the assembly unit so that it is readily removable.

We have also provided a bellows housing for attachment to the casing, when the apparatus requires a bellows or like actuating means, that allows rotation of the bellows and housing, independent of the casing but without detachment from the casing.

While the form of embodiment of the present invention as herein disclosed constitutes a preferred form, it is to be understood that other forms might be adopted, all coming within the scope of the claims which follow.

We claim:
1. A conduit box having an opening on one side thereof, a connection terminal block carried within said box adjacent said opening, said block having a terminal accessible through said open- ing, a cover for said opening including two interfitting parts, insulating means disposed on the inside of one of said interfitting parts and adjacent to the said terminal block, the second of said interfitting parts including means for connecting a conduit thereto, a removable wall for said box to lock the cover in place, and means adjacent to the conduit connecting means, and extending into the box for substantially forming a wall behind the conduit connecting means.

2. A conduit box including a fixed wall and a removable wall portion, said removable wall portion arranged to engage with the fixed wall, a second fixed wall disposed within the box and substantially behind the removable wall portion for shielding the inside of the box, a second removable wall portion for interfitting with the first named removable portion, and a third removable wall portion in locking the second named removable wall portion in place and thereby preventing displacement of the first named removable wall portion.

3. A conduit box having an opening on one side thereof, a connection terminal block carried within said box adjacent said opening, said block having a terminal accessible through said opening, a cover for said opening including two interfitting parts, insulating means disposed on the inside of one of said interfitting parts and adjacent to the said terminal block, the second of said interfitting parts including means for connecting a conduit thereto, and a removable wall in said box to lock the cover in place.

4. In an apparatus housing, a fixed wall having an opening therein; a plurality of removable wall members for covering said opening, one of said wall members having a part adapted to be interlocked with a part of said fixed wall, said parts being interlocked by sliding said one wall member relative to the fixed wall; a second one of said wall members being adapted to engage said one wall member when the latter wall member is interlocked with the fixed wall for preventing unlocking of said interlocking parts; a third removable wall member adapted to overlap a part of said second wall member for locking said second wall member in position; and means for securing the said third wall member to said housing.

5. In an apparatus housing, a fixed wall having an opening therein; a plurality of removable wall members for covering said opening, one of said wall members having a plurality of shoulders formed thereon adapted to extend through said opening and interlock with the opposite surface of said fixed wall for preventing separation of the said one wall from the fixed wall, said shoulders and wall being interlocked by sliding said one wall member relative to the fixed wall; a second one of said wall members being adapted to engage said one wall member when the latter wall member is interlocked with the fixed wall for preventing unlocking of said interlocking parts; a third removable wall member adapted to overlap a part of said second wall member for locking said second wall member in position; and means for securing the said third wall member to said housing.

ESTEL C. RANEY.
ARTHUR M. HOOVER.